UNITED STATES PATENT OFFICE.

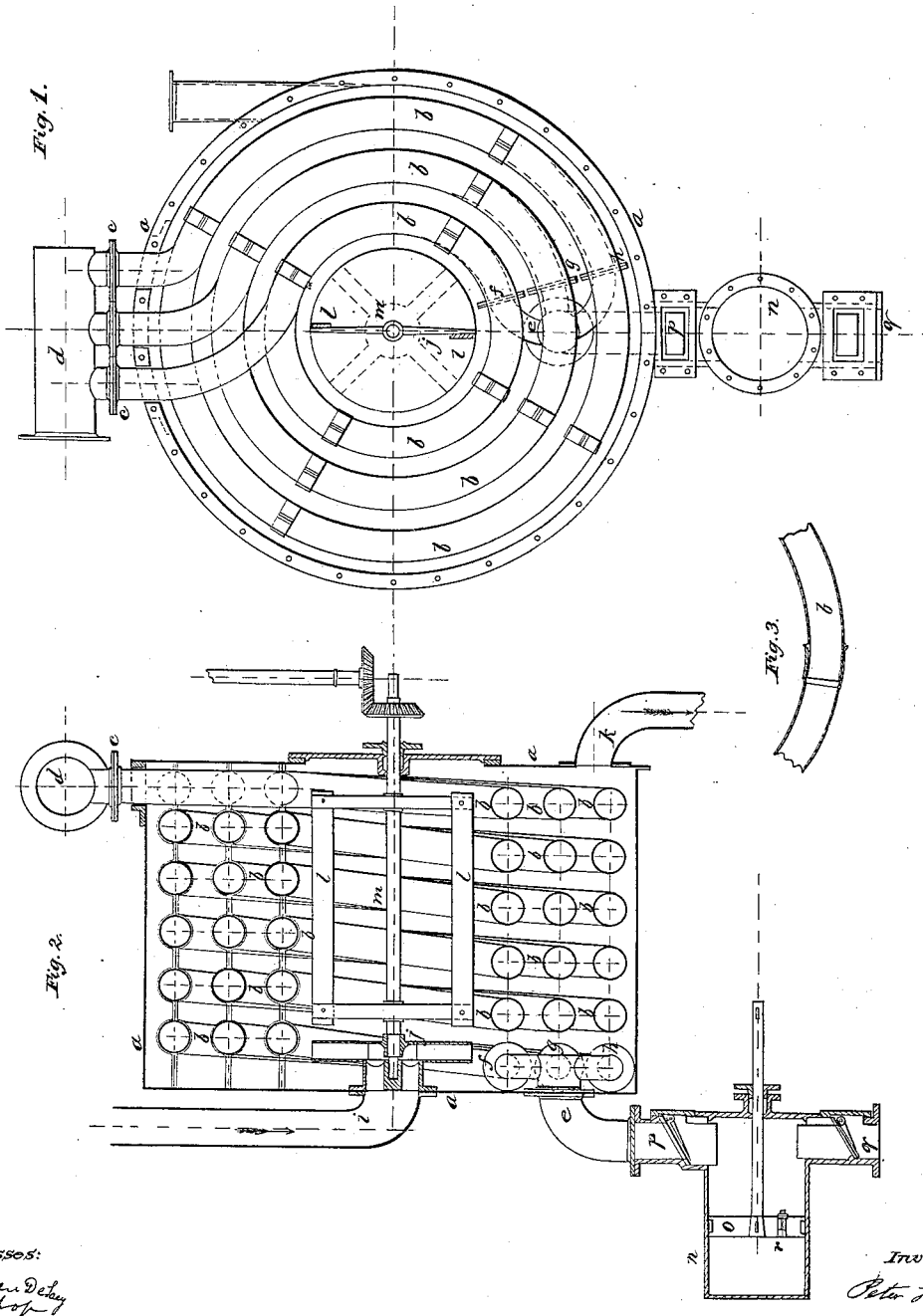

PETER HOGG, OF NEW YORK, N. Y.

SURFACE CONDENSER FOR STEAM-ENGINES.

Specification of Letters Patent No. 13,721, dated October 30, 1855.

*To all whom it may concern:*

Be it known that I, PETER HOGG, of the city, county, and State of New York, have invented certain new and useful Improvements in Surface Condensers for Steam-Engines, of which the following is a full, clear, and exact description, reference being had to the accompanying drawings, making part of this specification, in which—

Figure 1, is a top view with the top plate removed to exhibit the internal arrangement. Fig. 2, a vertical section; and Fig. 3, a section of one of the pipes to exhibit the manner of uniting the sections.

The same letters indicate like parts in all the figures.

In the said improved condenser the steam to be condensed passes through a series of coiled pipes in the form of still worms, the upper ends of which are each separately connected with the exhaust pipe of the engine and the lower ends with the discharge pipe leading to the air pump, and the condensing water enters the surrounding vessel at or near the bottom and is charged at or near the top. And my said invention consists in arranging two or more coiled pipes or worms for the passage of the steam or water, one within the other inside of the surrounding vessel and each separately connected at top with the exhaust pipe, and at bottom with the pipe leading to the air pump, so that the several coils can be separately removed and replaced for repairs. And my said invention also consists in causing the water surrounding the said coils of steam pipes to rotate in the said surrounding vessel as it enters at or near the bottom, and as it travels toward the discharge pipe at or near the top, by means of which I insure the rapid passage of the condensing water over the surface of the coiled pipes, thereby inducing a more rapid and effectual condensation of the steam than by any other known means.

In the accompanying drawings $a$ represents a cylindrical vessel closed at top and bottom, and containing three coils of tubes $b$, $b$, $b$, each in the form of a still worm, each in succession coiled in a smaller diameter that the several coils may be placed one within the other with sufficient space between them for the free circulation of water. The upper ends of the three pass through holes in the surrounding vessel $a$ near the top, and are there coupled separately by flanges $c$, $c$, $c$, with nozzles on the exhaust pipe $d$ of the engine. And the lower ends of the said coils are also coupled separately by flanges to nozzles on the sides of the pipe $e$ leading to the air pump; the inner coil is secured to the nozzle $f$ that projects toward the center of the vessel $a$, the next to the nozzle $g$, and the outer one to the nozzle $h$ projecting toward the outside of the vessel $a$.

By this arrangement and mode of attachment the coils can be removed separately for repairs, and replaced, which is a matter of great importance in a practical point of view.

In the center of the bottom of the vessel $a$ there is a pipe $i$ leading to, and for the introduction of, cold water. And within the vessel $a$ and immediately over this pipe $i$ is placed a rotary pump $j$ of any suitable construction which receives the cold water at the center from the pipe $i$ and discharges it from the periphery into the vessel $a$ from which it escapes through a pipe $k$ at top. In this way cold water circulates through the vessel and around the coils or worms of pipes, entering at the bottom and escaping at the top as it becomes heated by extracting the heat from the coiled pipes and thus effectually condensing the steam in the pipes.

To increase the cooling and condensing effect of the cold water I cause it to be kept traveling around in the vessel by means of vanes or paddles $l$, attached to arms projecting from a central shaft $m$, the upper end of which passes through the top of the vessel and is there connected with some suitable motor. As the water enters at the center of the bottom and escapes at the top and near the outside of the vessel $a$ the rotary motion imparted to it will cause it to circulate and pass over the surface of the coiled tubes in the direction the reverse of the passage of steam through them. I am enabled in this way to obtain a more thorough condensation of the steam with a given amount of metal surface than by any other known arrangement of surface condenser; while at the same time I avoid the deteriorating effects of the alternate expansion and contraction of the tubes, for being coiled in the form of a spiral and joined only at the ends the expansion and contraction due to the varying temperature will only cause the tubes to bend in a very slight degree. Again, the rapid circulation induced by the rotating vanes or other equivalent means will effectually condense the steam and induce a good vacuum, for the lower ends of the tubes are surrounded by the water as it first enters the vessel *a* and therefore cold.

The pipe connecting the coils with the air pump is placed near the top of the air pump cylinder *n* so that the water and air are received on the top of the piston *o* of the air pump *n* instead of below it as heretofore. And it will be seen that by thus locating the cylinder and piston the water of condensation will all descend from the condenser into the air pump by gravity and on the return or up stroke the foot valve *p* will be closed and the water simply lifted by the piston and discharged, instead of requiring pressure within the condenser to force it up as the piston rises and exhausts above it, in the mode heretofore practiced.

As the piston is in the lower part of the cylinder and discharges by rising from the bottom toward the discharge pipe *q*, which is at or near the top water may leak through between the piston and cylinder which in a short time would obstruct the working of the piston. To obviate this I make a small aperture *r* through the piston, to which is fitted a valve opening upward, so that as the piston descends, should water be found below the piston, it will pass through the valve aperture to, and above the piston and be discharged by the next upward stroke of the piston. This self acting valve in the piston opening upward will not prevent the production of a vacuum above the piston by its descent; because there is a vacuum below the piston which will insure the valves being kept close except when it meets with water below.

I do not wish to be understood as limiting myself to the number of coils to be used, as the number may be increased or diminished at pleasure; nor to the use of the coils for the passage of steam through them, as this part of my invention may be employed without the other parts, and so that the condensing water may pass through the said coils and the steam to be condensed outside of them; nor to the use of vanes or paddles to keep the water traveling around in the surrounding vessel as it passes from the bottom to the discharge pipe at top, as the motion of the water may be induced by means equivalent to the vanes for that purpose. Nor do I wish to limit myself to the special construction and arrangement of the air pump so long as the piston works below the bottom of the condenser for the purpose specified.

What I claim as my invention and desire to secure by Letters Patent is—

1. The arrangement of two or more coils or worms of pipes within a surrounding vessel when the several coils are in succession coiled of a smaller diameter and placed one within the other, and each separately attached at top and bottom in the manner substantially as and for the purpose specified.

2. I also claim causing the condensing water which enters the surrounding vessel to travel around in the said vessel, for the purpose herein specified and by means described or any equivalent therefor, as set forth.

PETER HOGG.

Witnesses:
 WM. H. BISHOP,
 ANDREW DE LACY.